United States Patent [19]
Matsuo

[11] Patent Number: 5,956,075
[45] Date of Patent: Sep. 21, 1999

[54] CATV TERMINAL UNIT

[75] Inventor: Tomohide Matsuo, Tokyo, Japan

[73] Assignee: NEC Corporation, Tokyo, Japan

[21] Appl. No.: 08/893,992

[22] Filed: Jul. 16, 1997

[30] Foreign Application Priority Data

Jul. 22, 1996 [JP] Japan .................................. 8-191288

[51] Int. Cl.[6] .................................................. H04N 7/10
[52] U.S. Cl. ................................. 348/10; 348/12; 455/6.2
[58] Field of Search ................................. 348/6, 10, 12,
348/13, 11, 7, 705, 706; 455/6.2, 3.1, 5.1,
6.1, 6.3, 4.1, 4.2, 3.3; H04N 7/16, 7/173

[56] References Cited

U.S. PATENT DOCUMENTS

| | | | |
|---|---|---|---|
| 4,924,303 | 5/1990 | Brandon et al. | 358/86 |
| 5,414,456 | 5/1995 | Oda et al. | 348/10 |
| 5,459,507 | 10/1995 | Sakuma et al. | 348/10 |
| 5,483,277 | 1/1996 | Granger | 348/6 |
| 5,488,413 | 1/1996 | Elder et al. | 348/13 |
| 5,546,119 | 8/1996 | Bestler et al. | 348/10 |
| 5,808,702 | 9/1998 | Yoshinobu et al. | 348/731 |
| 5,838,383 | 11/1998 | Chimoto et al. | 348/553 |

FOREIGN PATENT DOCUMENTS

6-253276  9/1994  Japan .

Primary Examiner—Andrew I. Faile
Assistant Examiner—Uyen Le
Attorney, Agent, or Firm—Foley & Lardner

[57] ABSTRACT

A level detecting device 7 detects the input level of a tuner 11 and an external unit connection terminal 15. Corresponding to the detected result, a gain controlling circuit 8 controls the attenuation amount of a variable attenuator 5 so that the input level becomes a predetermined level. Switches 3 and 14 are controlled corresponding to the power ON/OFF states. In the power OFF state, the system connection terminal 2 and the external unit connection terminal 15 are connected. An up signal that is output from an up signal generating circuit is output from the system connection terminal 2 (to a transmission cable 1) through a branching device 4 that branches the up signal and the down signal.

7 Claims, 9 Drawing Sheets

CATV TERMINAL UNIT

BACKGROUND OF THE INVENTION

1. Field of the Invention

The present invention relates to a CATV terminal unit, and in particular, to a CATV terminal unit for converting an input radio frequency (RF) signal into a desired channel and for directly supplying an input RF signal to a TV receiver, a VCR, or the like through a external unit connection terminal.

2. Description of the Related Art

As disclosed in, for example, Japanese Patent Laid-Open Publication No. 6-253276, such a CATV terminal unit is used so as to improve and stabilize S/N ratio of input signals of an external unit connection terminal side and an internal tuner side of the CATV terminal unit that has an external unit connection terminal for distributing the output signal to the external unit and the internal tuner.

Figure 14:
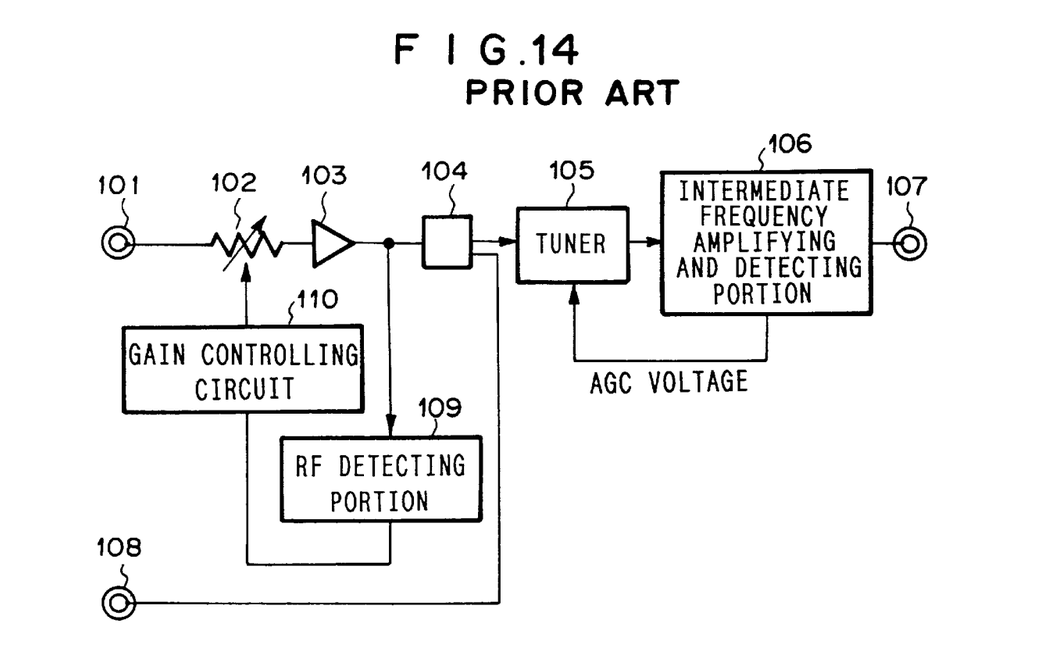
FIG. 14 is a schematic diagram showing the structure of a conventional CATV terminal unit.

FIG. 14 is a block diagram showing an example of the structure of a conventional CATV terminal unit.

The CATV terminal unit comprises a variable attenuator 102, a radio frequency amplifier 103, a distributing device 104, an external unit connection terminal 108, a tuner 105, an RF detecting portion 109, and a gain controlling circuit 110. The variable attenuator 102 adjusts the level of a picture signal received from a cable of the CATV system. The radio frequency amplifier 103 amplifies an output signal of the variable attenuator 102. The distributing device 104 distributes an output signal of the radio frequency amplifier 103 to the external unit connection terminal 108 and the tuner 105. The RF detecting portion 109 detects the level of an output signal of the radio frequency amplifier 103. The gain controlling circuit 110 receives an output signal of the RF detecting portion 109 and generates a control signal for controlling the attenuation amount of the variable attenuator 102 so as to control the attenuation amount of the variable attenuator 102.

Next, the operation of the CATV terminal unit shown in FIG. 14 will be described. A cable TV signal is received from a radio frequency (RF) input terminal. The cable TV signal is supplied to the radio frequency amplifier 103 through the variable attenuator 102. The output signal of the radio frequency amplifier 103 is supplied to the distributing device 104. The distributing device 104 distributes the signal received from the radio frequency amplifier 103 to both the tuner 105 and the external connection terminal 108. A VCR or the like can be connected to the external connection terminal 108.

The tuner 105 selects a channel and outputs an intermediate frequency signal. The intermediate frequency signal is supplied to the intermediate frequency amplifying and detecting portion 106. The intermediate frequency amplifying and detecting portion 106 demodulates a picture signal and an audio signal. An output signal of the intermediate frequency amplifying and detecting portion 106 is supplied to a terminal 107. In addition, the intermediate frequency amplifying and detecting portion 106 detects the amplitude of the intermediate frequency signal and so forth, generates an automatic gain control voltage (AGC voltage) and so forth in such a manner the level of the intermediate frequency signal becomes constant, and supplies the AGC voltage to an amplifier of the tuner 105.

In this apparatus, the output signal of the radio frequency amplifier 103 is supplied to the radio frequency detecting portion 109. The radio frequency detecting portion 109 detects for example the average level of the radio frequency signal. The detected output signal of the radio frequency detecting portion 109 is supplied to the gain controlling circuit 110. The gain controlling circuit 110 controls the attenuation amount of the variable attenuator 102 so that the average level is in a predetermined range. Thus, the noise and distortion of the output signal of the distributing device 104 can be stabilized.

A first drawback of the related art reference is in that in the power OFF state of the CATV terminal unit the RF signal received from the input terminal is not supplied to the external unit connection terminal.

In other words, in the power OFF state of the CATV terminal unit, the power is not supplied to the radio frequency amplifier of the CATV terminal unit. Thus, the signal is not supplied to circuits after the radio frequency amplifier.

A second drawback of the related art reference is in that an up signal for bidirectional communication cannot be sent.

In other words, a means for sending the up signal is not provided.

SUMMARY OF THE INVENTION

The present invention is made from the above-described point of view.

An object of the present invention is to provide a CATV terminal unit for stably supplying a signal with high S/N ratio and free from noise to an internal tuner and an external unit connection terminal in the power ON state and for supplying an input signal to the external unit connection terminal in the power OFF state.

Another object of the present invention is to provide a CATV terminal unit for supplying an up signal for bidirectional communication.

The CATV terminal unit according to the present invention supplies a signal with high S/N ratio and free from distortion to an internal tuner and a unit connected to an external unit connection terminal in the power ON state. The CATV terminal unit comprises a level detecting device disposed before a means for supplying a signal to the tuner and the external unit connection terminal for detecting the level of the input signal, a gain controlling circuit for generating a control signal corresponding to the detected result of the level detecting device, and a variable attenuator for varying the attenuation amount corresponding to a control signal received from the gain controlling circuit.

Even in the power OFF state of the CATV terminal unit, it supplies the input signal received from the system connection terminal to the external unit connection terminal. The CATV terminal unit has a first switch and a second switch disposed between the system connection terminal and the external unit connection terminal. The first switch switches a portion to be connected to the system connection terminal corresponding to the power ON/OFF state. The second switch switches a portion to be connected to the external unit connection terminal corresponding to the power ON/OFF state.

In addition, the CATV terminal unit can send an up signal for bidirectional communication. The CATV terminal unit includes a branching device for branching an up signal and a down signal and an up signal generating circuit connected to a first terminal of the branching device for generating the up signal.

The CATV terminal unit according to the present invention varies the attenuation amount of the variable attenuator corresponding to the signal level at the stage before the internal tuner and the external unit connection terminal. Thus, in the power ON state, a signal with high S/N ratio and free from distortion is supplied to the internal tuner and the external unit connection terminal.

The first switch and the second switch are controlled corresponding to the power ON/OFF state. Thus, in the power OFF state, the system connection terminal and the external unit connection terminal are connected through the first switch and the second switch. The input signal received from the system connection terminal is supplied to the external unit connection terminal.

In the power ON state, the output signal of the up signal generating circuit is supplied to the branching device. The branching device removes unnecessary signals other than the output signal of the up signal generating circuit. The output signal of the branching device is supplied to the system connection terminal. The branching device does not send the up signal to a down signal processing block. Thus, the up signal for bidirectional communication can be sent.

Further, the CATV terminal unit of the present invention comprises a first switch having a common terminal, a first terminal, and a second terminal, the common terminal being connected to a transmission cable, the common terminal being connected to the first terminal in power ON state, the common terminal being connected to the second terminal in power OFF state, a second switch having a common terminal, a first terminal, and a second terminal, the common terminal being connected to the first terminal in the power OFF state, the common terminal being connected to the second terminal in the power ON state, the first terminal of said second switch being connected to the second terminal of said first switch, a branching device, connected to the first terminal of said first switch, for branching the frequency of the output signal of said first switch into two frequency bands connected to at least a high band terminal and a low band terminal, an up signal generating circuit, connected to the low band terminal of said branching device, for outputting the low band frequency as an up signal, a radio frequency AGC circuit, connected to the high band terminal of said branching device, for receiving a down signal from the transmission cable and varying the gain of the down signal with a level detecting device, and a distributing device for distributing an output signal of said radio frequency AGC circuit, wherein a first output terminal of said distributing device is connected to the second terminal of said second switch, in power ON state the up signal and down signal being sent and received through the transmission cable, respectively, in power OFF state the down signal being directly sent as it is to the external unit through the transmission cable.

These and other objects, features and advantages of the present invention will become more apparent in light of the following detailed description of best mode embodiments thereof, as illustrated in the accompanying drawings.

DESCRIPTION OF PREFERRED EMBODIMENTS

An first embodiment of the present invention will be described with reference to FIG. 1.

A system connection terminal 2 of a CATV terminal unit is an input/output terminal for sending/receiving a signal to/from the center station of the CATV system through a transmission cable 1. The system connection terminal 2 is normally composed of an F type connector. A 75 ohm coaxial cable is often used for connecting the CATV system and the CATV terminal unit.

A common terminal of a switch 3 is connected to the system connection terminal 2. The switch 3 switches the portion to be connected to the system connection terminal 2 to a branching device 4 or a switch 14 corresponding to the power ON/OFF state.

An external unit connection terminal 15 is a terminal for connecting the CATV terminal unit to a unit with a tuner such as a TV receiver or a VCR. As with the system connection terminal 2, the external unit connection terminal 15 is normally composed of an F type connector. In addition, a 75 ohm coaxial cable is used for connecting the CATV terminal unit to the unit such as the TV receiver or the VCR.

A common terminal of the switch 14 is connected to the external unit connection terminal 15. The switch 14 switches the portion to be connected to the external unit connection terminal 15 to either a distributing device 10 or the switch 3 corresponding to the power ON/OFF state.

Figure 5:
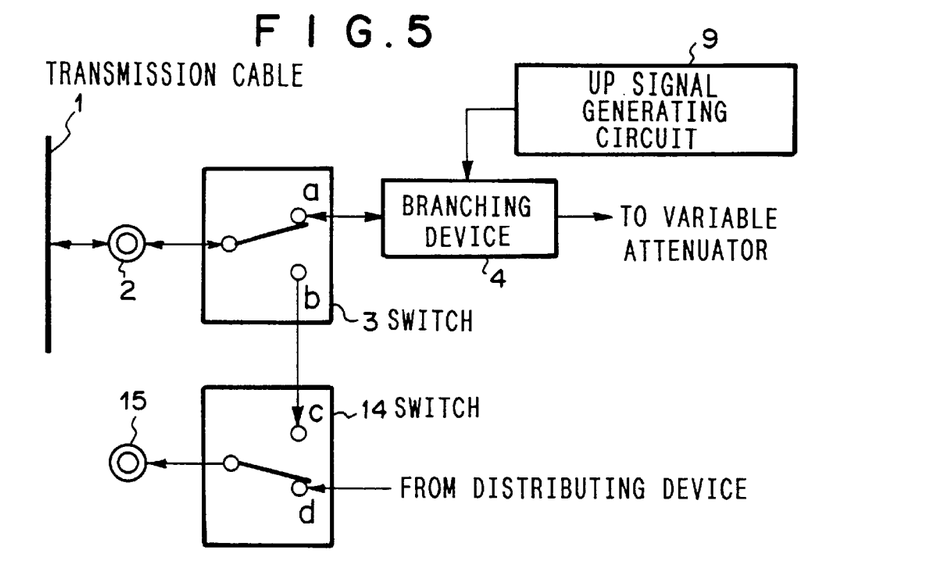
FIG. 5 is a schematic diagram for explaining operations of switches according to an embodiment of the present invention.
Figure 6:
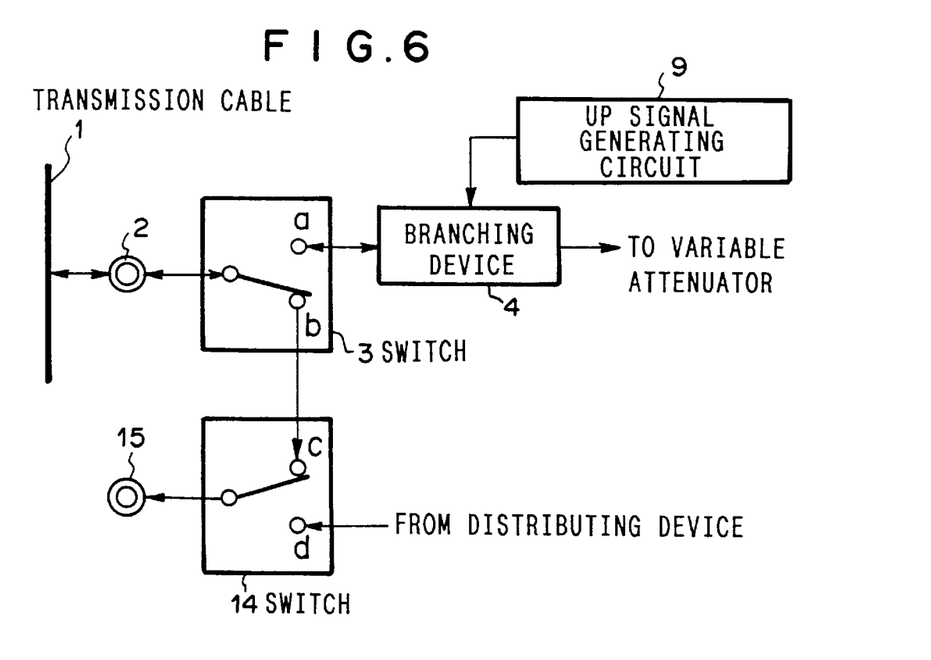
FIG. 6 is a schematic diagram for explaining the operations of the switches according to an embodiment of the present invention.

FIGS. 5 and 6 show examples of operations of the switches 3 and 14. FIG. 5 shows the operations of the switches 3 and 14 in the power ON state. FIG. 6 shows the operations of the switches 3 and 14 in the power OFF state.

An up signal generating circuit 9 generates an up signal for bidirectional communication. A branching device 4 branches a down signal supplied to the CATV terminal unit through the transmission cable 1 and an up signal supplied from an up signal generating circuit 9. In the conventional CATV system, the up signal and the down signal are frequency modulated and transmitted through the transmission cable 1. Thus, the branching device 4 is composed of a down signal extracting filter and an up signal extracting filter.

A variable attenuator 5 adjusts the level of the down signal received through the branching device 4.

An RF amplifier 6 amplifies an output signal of the variable attenuator 5. The RF amplifier 6 should have stable amplifying characteristics and group delay frequency characteristics in the frequency range of the down signal.

A level detecting device 7 detects the level of an output signal of the RF amplifier 6. As an example of the level detecting method, the average level of the signal or the peak level of the signal is detected.

A gain controlling circuit 8 generates a control signal for controlling the attenuation amount of the variable attenuator 5. With the control signal of the gain controlling circuit 8, the attenuation amount of the variable attenuator 5 is controlled so that the output level of the RF amplifier becomes in a predetermined level range. The variable attenuator 5, the RF amplifier 6, the level detecting device 7, and the gain controlling circuit 8 form a radio frequency AGC circuit. The radio frequency AGC circuit varies the gain corresponding to the level of the input signal so as to obtain a predetermined output level.

A distributing device 10 distributes an output signal of the RF amplifier 6 to two ways. A first distributed output signal of the distributing device 10 is supplied to a tuner 11 through a channel selecting unit (not shown) that selects a channel that the user has designated. The tuner 11 converts the distributed signal into an intermediate frequency signal (IF signal). An IF demodulating circuit 12 demodulates the IF signal into a picture signal and an audio signal.

The IF demodulating circuit 12 supplies an automatic gain control voltage (AGC voltage) to the tuner 11 so that the level of the IF signal of the tuner 11 becomes constant.

A second distributed output signal of the distributing device 10 is supplied to the switch 14.

Next, with reference to the accompanying drawings, the operations of the CATV terminal unit in the power ON/OFF states will be described one after the other.

Figure 7:
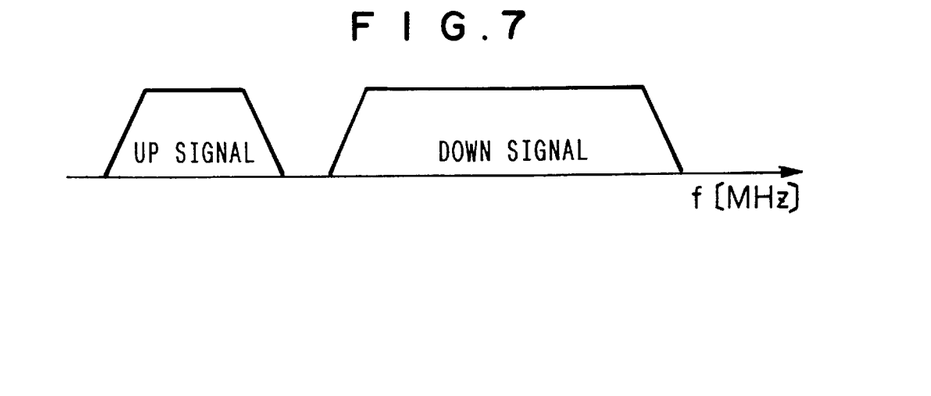
FIG. 7 is a schematic diagram showing a frequency assignment according to an embodiment of the present invention.

FIG. 7 shows examples of frequency bands of the up signal and down signal that are frequency multiplexed on the transmission cable 1. Referring to FIG. 7, the up signal and the down signal are assigned to the low frequency band and the high frequency band, respectively.

(a) In the power ON state of the CATV terminal unit:

In the power ON state, the contacts of the switches 3 and 14 are connected as shown in FIG. 5. In FIG. 1, the down signal received from the system connection terminal 2 is supplied to the branching device 4 through the switch 3.

Figure 8:
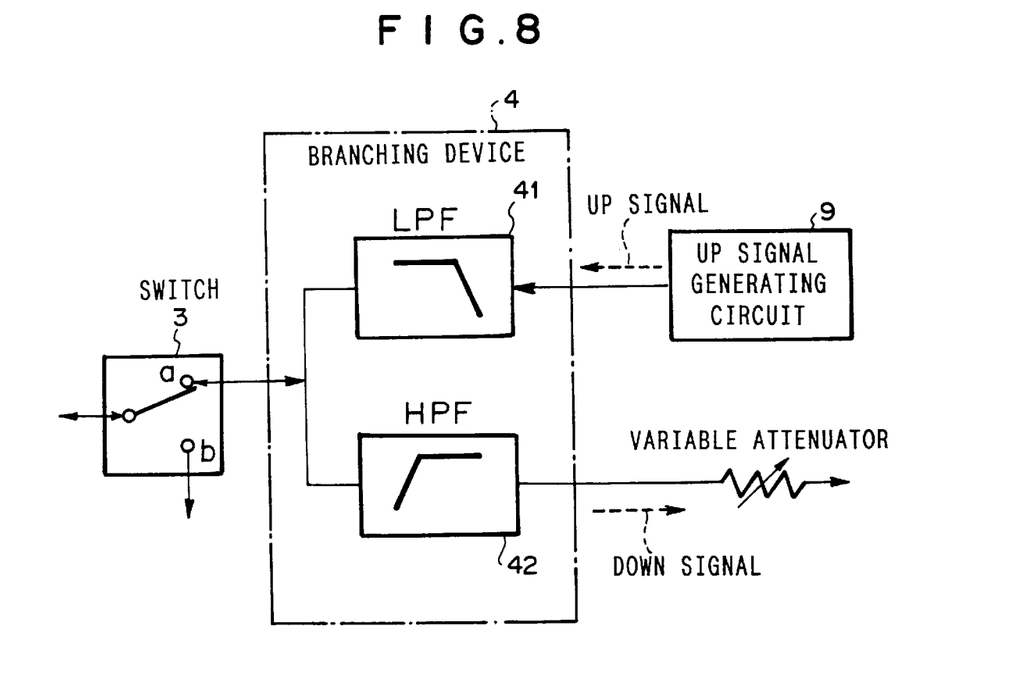
FIG. 8 is a schematic diagram showing the structure of a branching device according to an embodiment of the present invention.

FIG. 8 shows an example of the structure of the branching device 4. The branching device 4 is composed of a high pass filter (HPF) 42 and a low pass filter (LPF) 41. The high pass filter 42 passes only the down signal assigned to the high frequency band. The low pass filter 41 passes only the up signal assigned to the low frequency band.

When the down signal is supplied to the branching device 4, the down signal passes through the HPF 42 shown in FIG. 8. The HPF 42 removes unnecessary signals other than the down signal. An output signal of the branching device 4 is supplied to a distributing circuit 10 through a variable attenuator 5 and an RF amplifier 6. The distributing device 10 distributes the down signal to two ways.

The output signal of the RF amplifier 6 is also supplied to the level detecting device 7. The output signal of the RF amplifier 6 is always detected by the level detecting device 7. When the output level of the RF amplifier 6 is larger than a predetermined level, the waveform of the down signal may be distorted by circuits disposed downstream of the RF amplifier 6 and the distributing device 10 (for example, an amplifying circuit in the tuner 11 and an amplifying circuit at the first stage of a unit connected to the external unit connection terminal). Thus, when the output level of the RF amplifier 6 exceeds the predetermined level, the level detecting device 7 detects the level and controls the attenuation amount of the variable attenuator 5 through the gain controlling circuit 8. Thus, the level of the input signal of the RF amplifier 6 is suppressed and the output level of the RF amplifier 6 becomes the predetermined level.

The first distributed output signal of the distributing circuit 10 is supplied to the external unit connection terminal 15 through the switch 14. Thus, the signal is supplied to the unit such as a TV receiver or a VCR connected to the external unit connection terminal 15.

The second distributed output signal of the distributing device 10 is supplied to the tuner 11. The tuner converts the output signal of the distributing device 10 into an IF signal. The IF signal is supplied to an IF demodulating circuit 12. The IF demodulating circuit 12 demodulates the IF signal into a picture signal and an audio signal as a base band signal. The picture signal and the audio signal are output to an output terminal 13. The base band signal that is output from the output terminal 13 is supplied to a monitor terminal of the TV receiver. Thus, the user can watch the selected channel on the TV receiver.

On the other hand, the up signal for bidirectional communication is supplied from the up signal generating circuit 9 to an LPF 41 of the branching device 4 shown in FIG. 8. The LPF 41 removes unnecessary signals other than the up signal. The resultant up signal is sent to the transmission cable 1 through the switch 3 and the system connection terminal 2.

(b) In the power OFF state of the CATV terminal unit:

In the power OFF state, the contacts of the switches 3 and 14 are connected as shown in FIG. 6.

Figure 1:
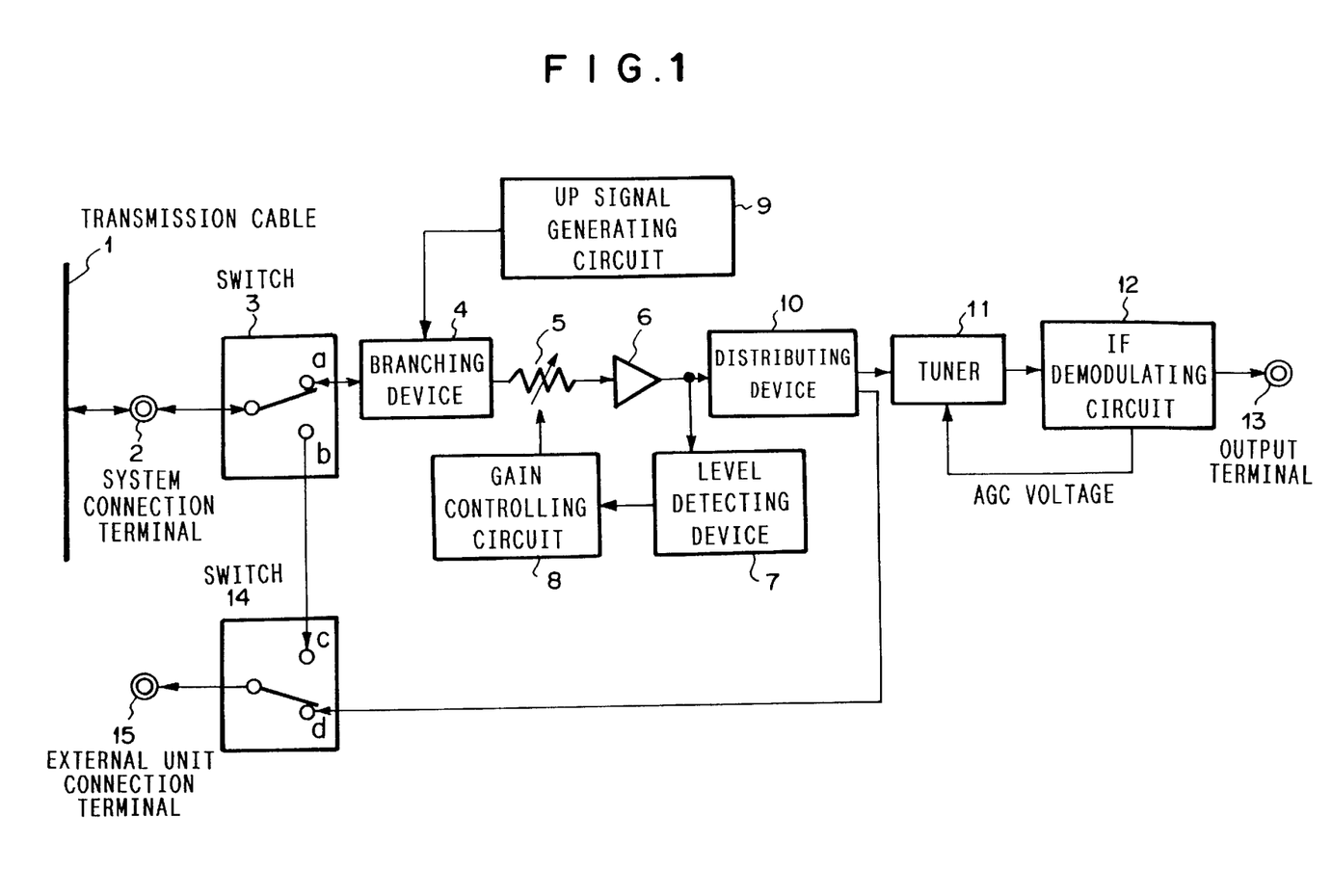
FIG. 1 is a block diagram showing the structure of a CATV terminal unit according to a first embodiment of the present invention.

In FIG. 1, the down signal received from the system connection terminal 2 is supplied as it is to the unit connected to the external unit connection terminal 15 through the switch 3, the switch 14, and the external unit connection terminal 15.

With the above-described operations, in the power ON state, a stable signal with high S/N ratio and free from distortion can be supplied to the tuner and the external unit connection terminal.

Even in the power OFF state, the input signal can be supplied to the external unit connection terminal.

In addition, the up signal for bidirectional communication can be sent.

Next, with reference to the accompanying drawings, a second embodiment of the present invention will be described in detail.

Figure 2:
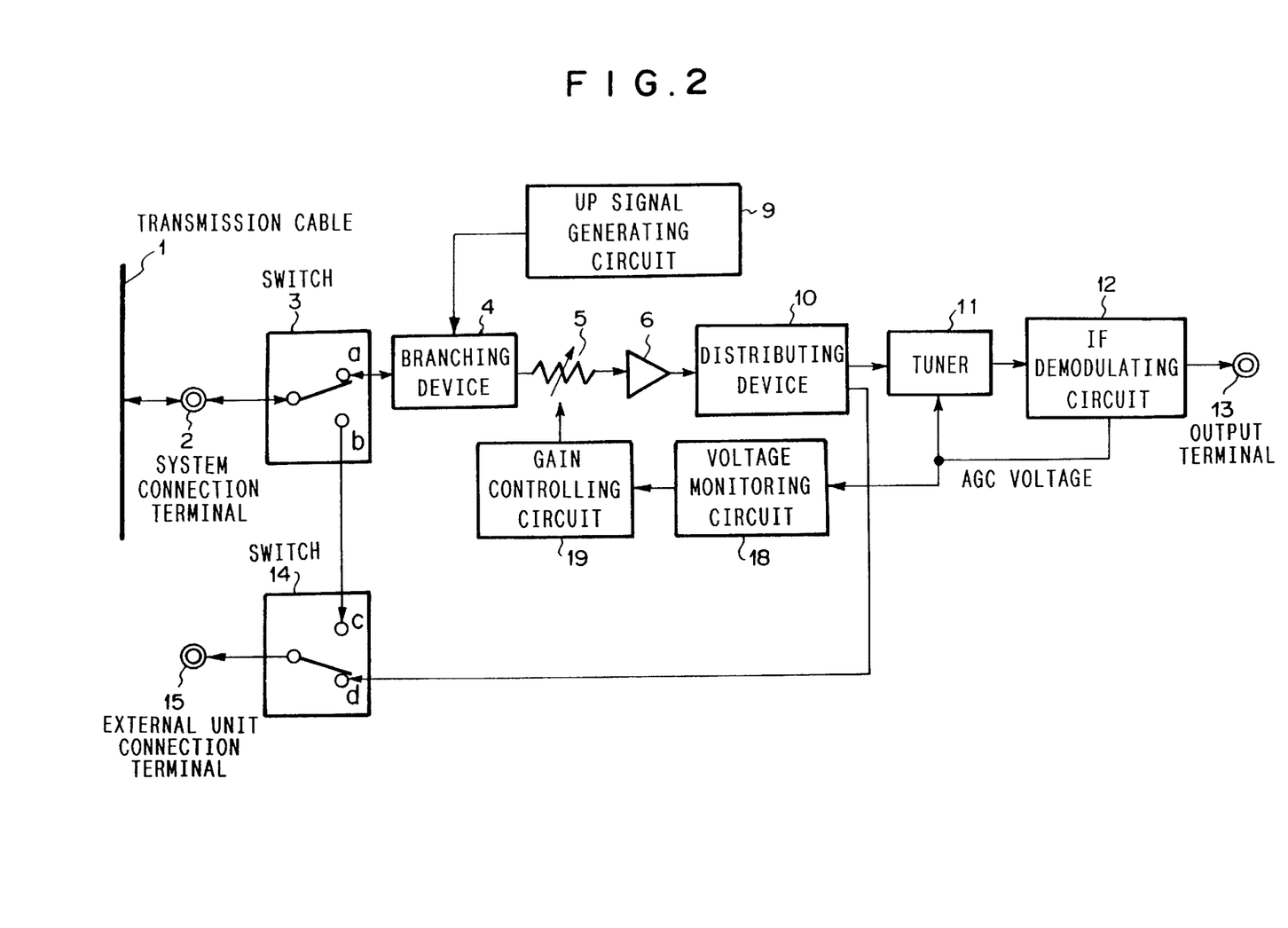
FIG. 2 is a block diagram showing the structure of a CATV terminal unit according to a second embodiment of the present invention.

Unlike with the structure of the first embodiment shown in FIG. 1, referring to FIG. 2, a CATV terminal unit according to the second embodiment has a voltage monitoring circuit 18 that monitors an AGC voltage supplied from an IF demodulating circuit 12 to a tuner 11.

For simplicity, in FIG. 2, similar portions to those in FIG. 1 are denoted by similar reference numerals and their description is omitted.

The operations of switches 3 and 14 of the second embodiment shown in FIG. 2 are the same as those of the first embodiment shown in FIG. 1. The operation in the power OFF state of the CATV terminal unit according to the second embodiment is the same as the operation in the power OFF state of the CATV terminal unit according to the first embodiment. Thus, only the operation in the power ON state of the CATV terminal unit according to the second embodiment will be described.

Figure 9:
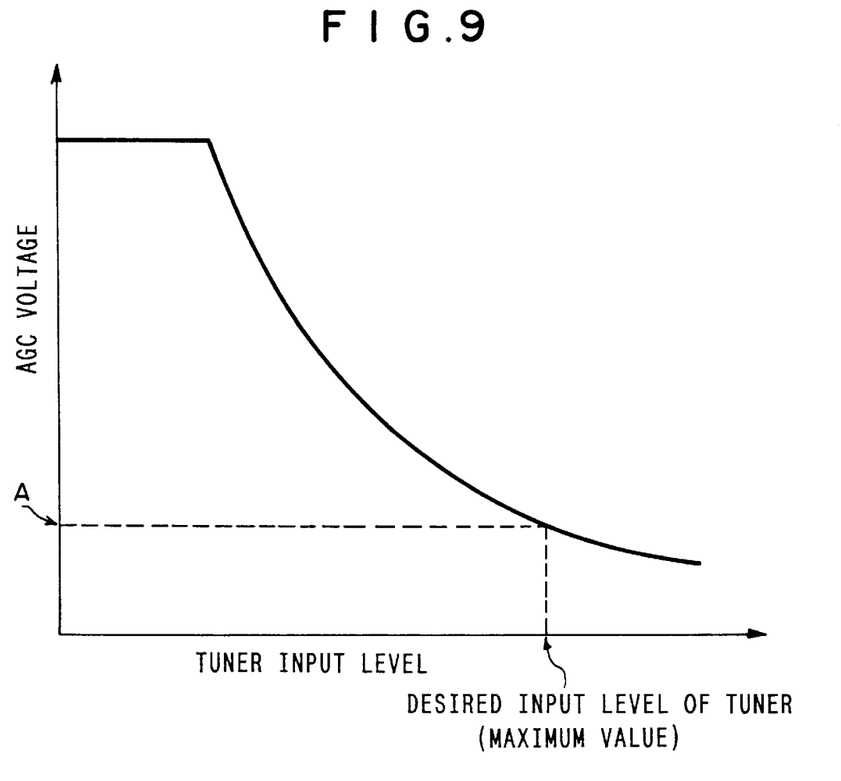
FIG. 9 is a graph showing an AGC characteristic according to an embodiment of the present invention.

The voltage monitoring circuit 18 monitors an AGC voltage that is output from the IF demodulating circuit 12. When the AGC voltage exceeds a predetermined threshold value, the voltage monitoring circuit 18 determines that the input level of the tuner 11 exceeds a predetermined level and controls a variable attenuator 5 through a gain controlling circuit 19 so as to increase the attenuation amount of the variable attenuator 5. FIG. 9 shows the relation between the output AGC voltage of the IF demodulating circuit 12 and the input level of the tuner 11. When the input level of the tuner 11 increases, the AGC voltage that is output from the IF demodulating circuit 12 decreases. When the input level of the tuner 11 exceeds the predetermined level, the AGC voltage decreases to point A or below as shown in FIG. 9. When the voltage monitoring circuit 18 detects the decrease of the AGC voltage below the point A, the gain controlling circuit 19 controls the variable attenuator 5 so as to increase the attenuation amount.

Thus, the input level of the tuner 11 and the external unit connection terminal 15 becomes in the predetermined range. Consequently, the same effect as the first embodiment can be obtained.

Next, with reference to the accompanying drawing, a third embodiment of the present invention will be described.

Figure 3:
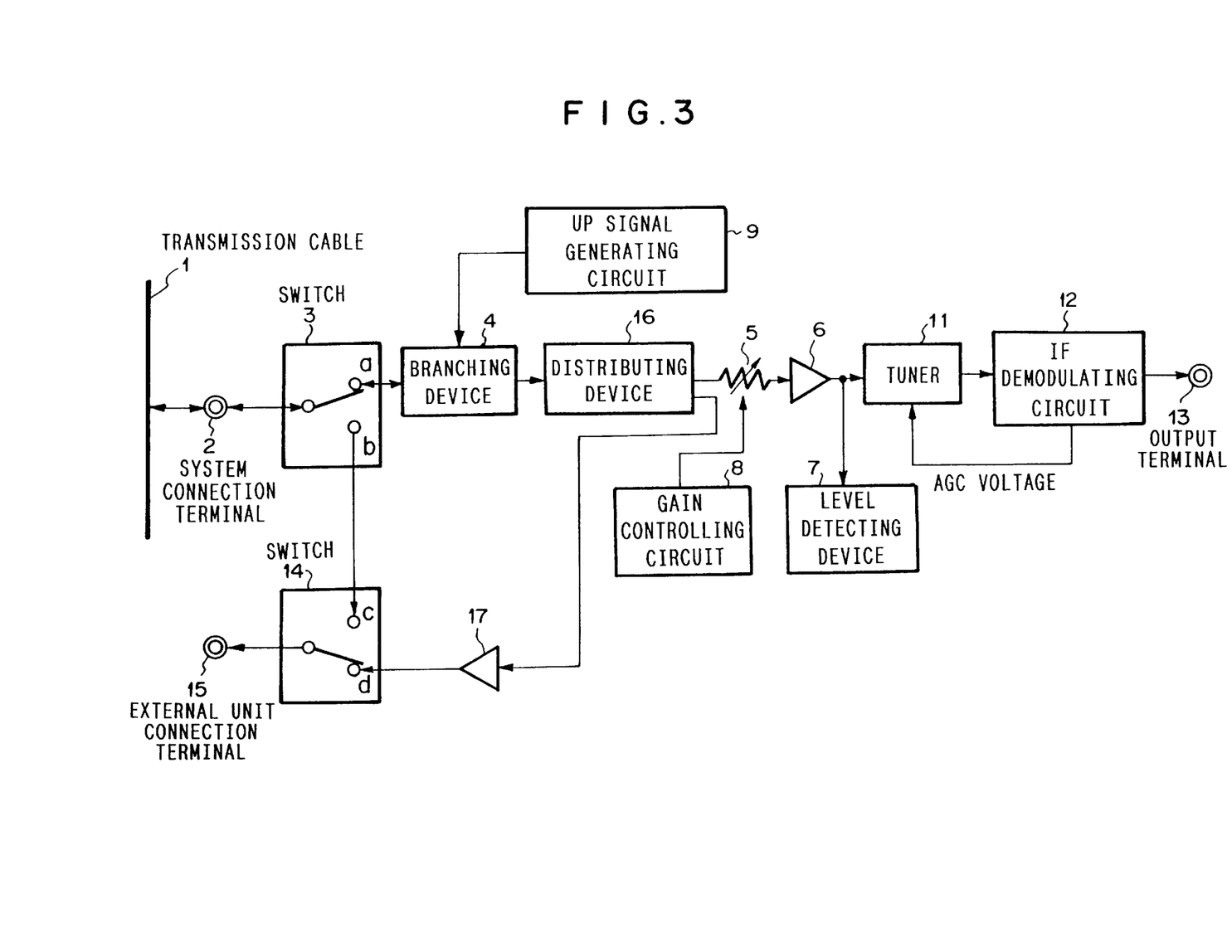
FIG. 3 is a block diagram showing the structure of a CATV terminal unit according to a third embodiment of the present invention.

Unlike with the structure of the first embodiment shown in FIG. 1, referring to FIG. 3, in the structure of the third embodiment, a distributing device 16 is disposed after a branching device 4.

For simplicity, in FIG. 3, similar portions to those in FIG. 1 are denoted by similar reference numerals and their description is omitted.

The operations of switches 3 and 14 of the third embodiment are the same as those of the first embodiment. Thus, the operation in the power OFF state of the CATV terminal unit according to the third embodiment is the same as the operation in the power OFF state of the CATV terminal unit according to the first embodiment. Thus, the operation in the power ON state of the CATV terminal unit according to the third embodiment will be described.

A first distributed output signal of the distributing device 16 is supplied to a variable attenuator 5. The operations of the blocks after the variable attenuator 5 are the same as those of the first embodiment.

A second distributed output signal of the distributing device 16 is supplied to an RF amplifier 17. The RF amplifier 17 amplifies the signal received from the distributing device 16. An output signal of the RF amplifier 17 is supplied to a unit connected to an external unit connection terminal 15 through a switch 14 and the external unit connection terminal 15. The amplitude (gain) of the RF amplifier 17 is designated to the same branch loss of the distributing device 16. For example, when the branch loss of the distributing device 16 is 10 dB, the amplitude gain of the RF amplifier 17 becomes 10 dB.

In the third embodiment of the present invention, the level of the output signal of the external unit connection terminal 15 in the power ON state is nearly the same as that in the power OFF state.

Next, with reference to the accompanying drawings, a fourth embodiment of the present invention will be described.

Figure 4:
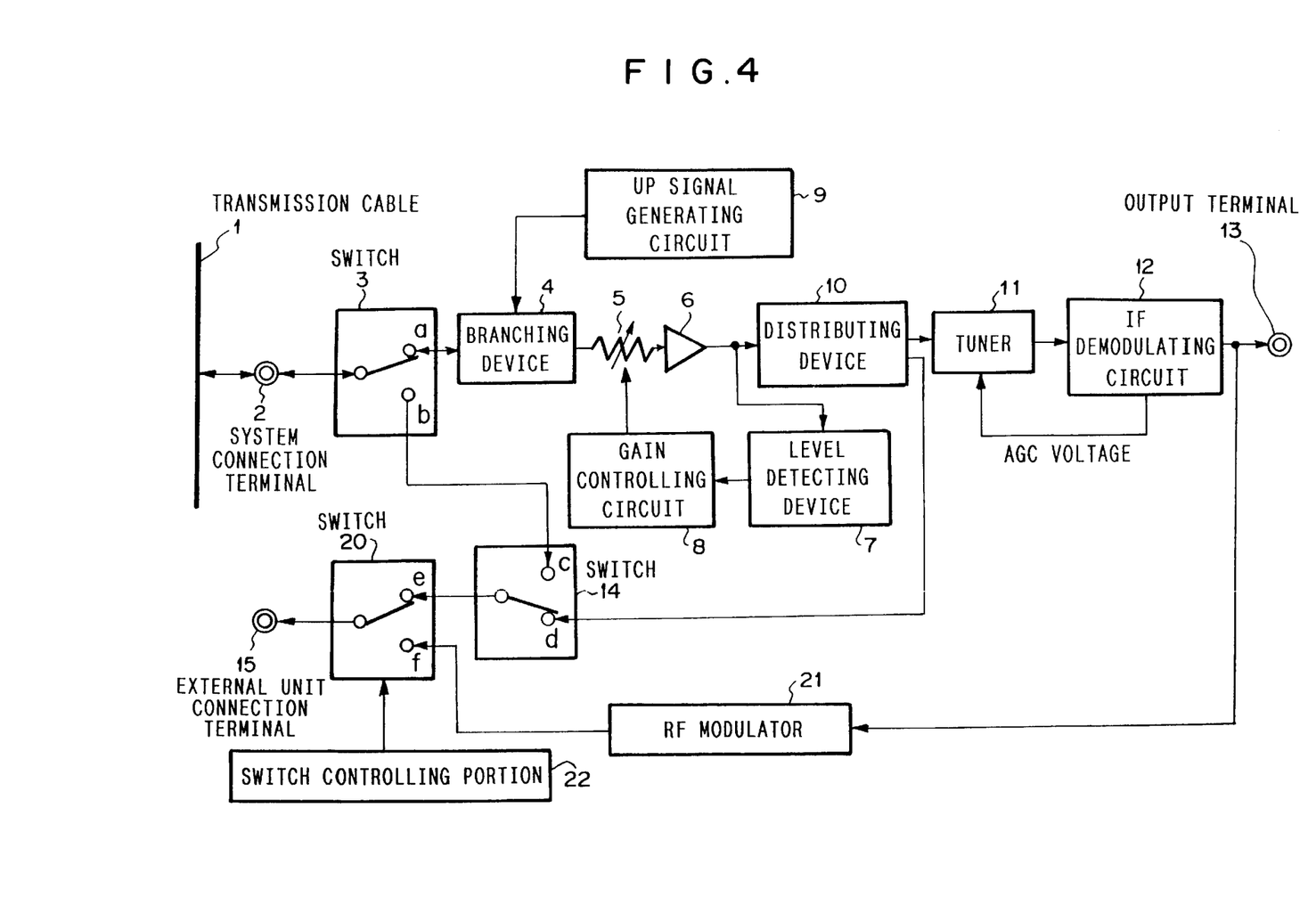
FIG. 4 is a block diagram showing the structure of a CATV terminal unit according to a fourth embodiment of the present invention.

Unlike with the structure of the first embodiment shown in FIG. 1, referring to FIG. 4, a CATV terminal unit according to the fourth embodiment includes a switch 20, an RF modulator 21, and a switch controlling portion 22. The switch 20 is disposed between a switch 14 and an external unit connection terminal 15. The RF modulator 21 is disposed between an output terminal 13 and a switch 20. The switch controlling portion 22 controls the switch 20.

For simplicity, in FIG. 4, similar portions to those in FIG. 1 are denoted by similar reference numerals and their description is omitted.

The RF modulator 21 modulates a picture signal and an audio signal as a base band signal into a predetermined RF signal. In Japan, the modulation frequency is for example channel 1 (picture carrier frequency: 91.25 MHz) or channel 2 (picture carrier frequency: 97.25 MHz). In the United States, the modulation frequency is for example channel 3 (picture carrier frequency: 61.25 MHz) or channel 4 (picture carrier frequency: 67.25 MHz).

The operations of switches 3 and 14 are the same as those of the first embodiment shown in FIGS. 5 and 6.

In the power OFF state, the contact of the switch 20 is always connected to a terminal e shown in FIG. 4. In the power ON state, the switch 20 is controlled by the switch controlling portion 22. Thus, the switch 20 selects an input signal received from the system connection terminal or an output signal received from the RF modulator.

In the fourth embodiment of the present invention, in the power OFF state, the same effect as the first embodiment can be obtained. In the power ON state, with a TV receiver having only an RF signal input interface (namely, that does not have a base band signal input interface), the user can watch pay programs of the CATV system.

Next, with reference to the accompanying drawings, the fourth embodiment of the present invention will be described in detail.

In FIG. 4, the switches 3, 14, and 20 are composed of radio frequency relays that can pass radio frequency signals without signal losses.

Figure 10:
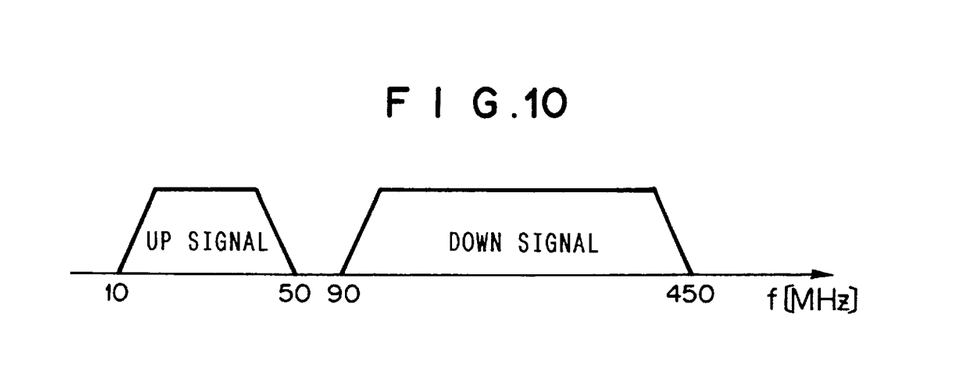
FIG. 10 is a schematic diagram showing a frequency assignment according to an embodiment of the present invention.

FIG. 10 shows a frequency assignment of a down signal and an up signal. The down signal is assigned to a frequency band ranging from 90 MHz to 450 MHz. The up signal is assigned to a frequency band ranging from 10 MHz to 50 MHz. The down signal is composed of a TV signal with a band width of 6 MHz per channel.

Figure 11:
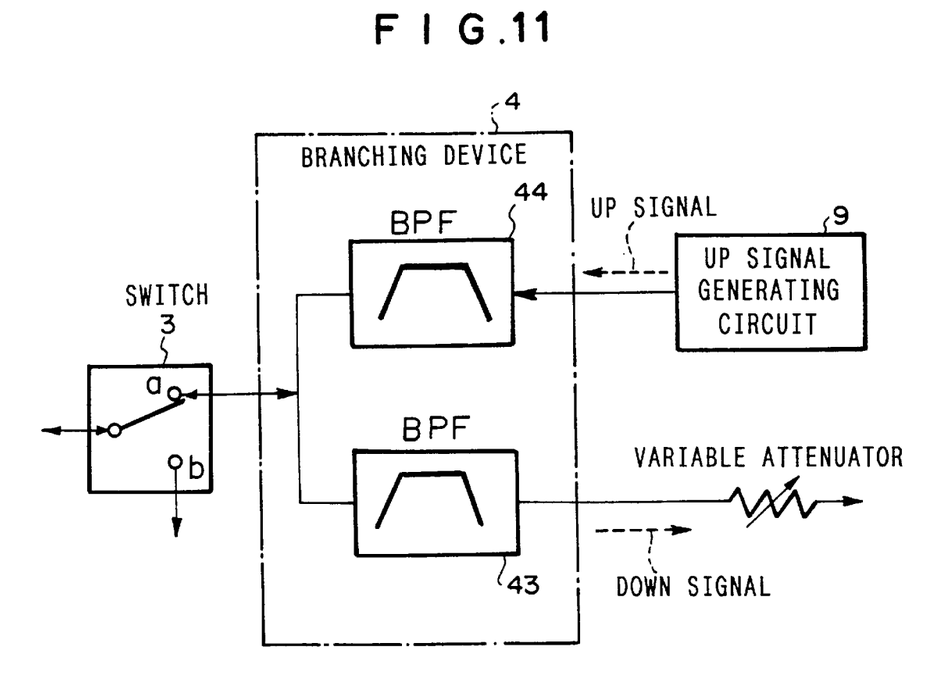
FIG. 11 is a schematic diagram showing the structure of a branching device according to an embodiment of the present invention.
Figure 12:
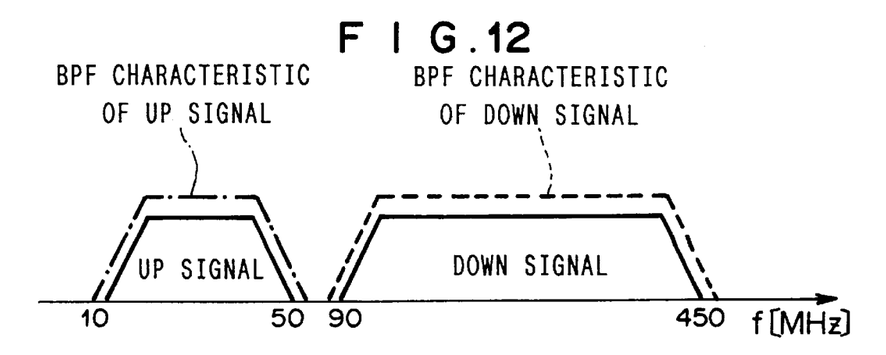
FIG. 12 is a schematic diagram showing filter characteristics of the branching device according to an embodiment of the present invention.

FIG. 11 shows the structure of a branching device 4 that branches the down signal and the up signal. FIG. 12 shows characteristics of filters of the branching device 4. A filter that passes only the down signal is composed of a band pass filter (BPF) 43 that passes only frequencies ranging from 90 MHz to 450 MHz. However, this filter may be a HPF that can pass frequencies higher than 90 MHz that is the minimum frequency of the down signal.

The filter that passes only the up signal is composed of a BPF 44 that passes only frequencies ranging from 10 MHz to 50 MHz that are a frequency band of the up signal. However, this filter may be a LPF that can pass less than 50 MHz that is the maximum frequency of the up signal.

Figure 13:
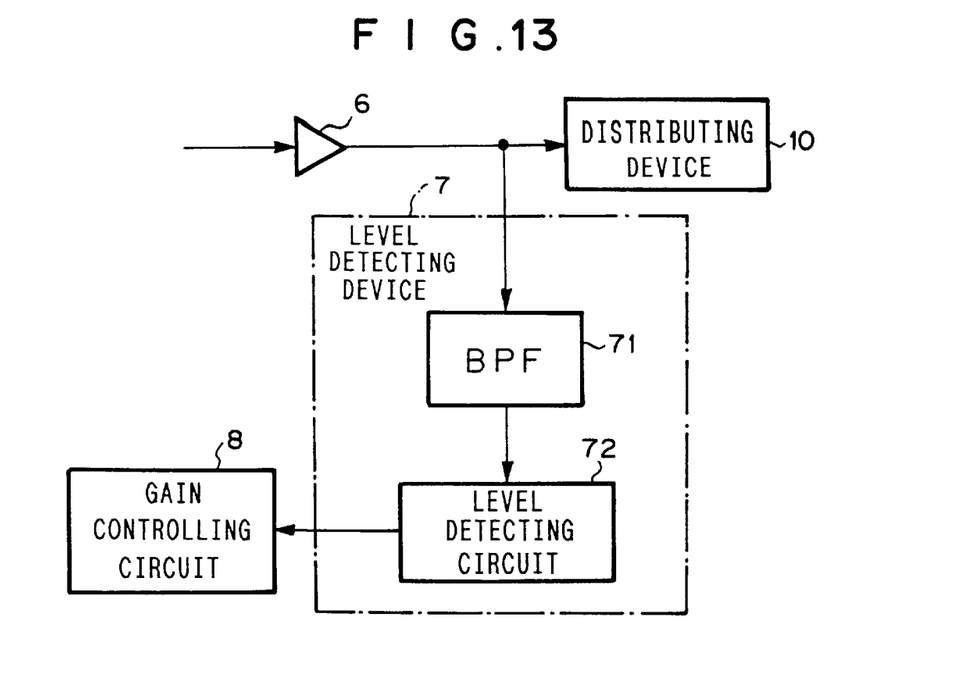
FIG. 13 is a schematic diagram showing the structure of a level detecting device according to an embodiment of the present invention.

As shown in FIG. 13, the level detecting device 7 that detects the output level of the RF amplifier 6 has a band pass filter (BPF 71) that passes only a particular channel signal of the down signal and a level detecting circuit 72 for detecting a output level of the band pass filter 71. Thus, the level detecting device 7 detects the level of the channel signal. The band width of one channel of the down signal is 6 MHz. Thus, the BPF 71 of the level detecting device 7 passes only a particular channel signal with a 6 MHz band width. Besides the above-described particular channel signal, a pilot signal placed for controlling the level of a bus amplifier of the CATV system may be used.

The RF modulator 21 modulates a picture signal and a sound signal as a base band signal into an RF signal whose band width is 6 MHz and whose picture carrier frequency is for example 97.25 MHz (equivalent to channel 2 in Japan).

Next, with reference to FIG. 4, the operation of an embodiment of the present invention will be described.

(a) In the power ON state of the CATV terminal unit:

In the power ON state, the contacts of the switches 3 and the switches 14 are connected as shown in FIG. 5. In FIG. 4, the down signal received from the system connection terminal 2 is supplied to the branching device 4 through the switch 3.

The down signal that has been input to the branching device 4 is supplied to the BPF 43 (see FIG. 11) of the branching device 4. The branching device 4 removes unnecessary signals other than the down signal. The resultant down signal is supplied to the distributing device 10 through the variable attenuator 5 and the RF amplifier 6. The distributing device 10 distributes the down signal to two ways.

An output signal of the RF amplifier 6 is also supplied to the level detecting device 7. The BPF 71 (see FIG. 13) of the level detecting device 7 extracts a particular signal for detecting the level of the output signal of the RF amplifier 6. An example of the extracted signal is a pilot signal or the like. When the output level of the RF amplifier 6 exceeds a predetermined level, the level detecting device 7 detects the predetermined level and controls the attenuation amount of the variable attenuator 5 through the gain controlling circuit 8. Thus, the level of the input signal of the RF amplifier 6 is suppressed so that the level of the output signal of the RF amplifier 6 becomes the predetermined level.

The first distributed output signal of the distributing device 10 is supplied to a first input terminal (terminal e) of the switch 20 through the switch 14.

The second distributed output signal of the distributing device 10 is supplied to the tuner 11. The tuner 11 converts the output signal of the distributing device 10 into an IF signal. The IF signal is supplied to the IF demodulating circuit 12. The IF demodulating circuit 12 demodulates the output signal of the tuner 11 into a picture signal and an audio signal (as a base band signal). The picture signal and the audio signal are supplied from the output terminal 13. The output terminal 13 is composed of, for example, an RCA type pin jack connector. When a TV receiver with an AV input terminal (a base band input terminal) is connected to the output terminal 13, the user can watch pay programs received and selected by the tuner 11.

The base band output signal of the IF demodulating circuit 12 is also supplied to the RF modulator 21. The RF modulator 21 modulates the base band output signal into an RF signal whose band width is 6 MHz and whose picture carrier frequency is for example 97.25 MHz (equivalent to channel 2 in Japan). The output signal of the RF modulator 21 is supplied to a second input terminal (terminal f) of the switch 20.

Thus, the switch 20 receives a output signal of the RF modulator 21 through signal (on the transmission cable 1) that is received from the system connection terminal 2 and the RF signal whose picture carrier frequency is 97.25 MHz and that is selected by the tuner 11 of the CATV terminal unit. With the control signal received from the switch controlling circuit 22, one of the through signal and the RF signal can be selected and supplied to the unit connected to the external unit connection terminal 15. Thus, the user can watch pay programs received and selected by the CATV terminal unit even with a TV receiver that does not have an AV input terminal.

The up signal for bidirectional communication is output from the up signal generating circuit 9. The up signal is supplied to the BPF 44 (see FIG. 11) of the branching device 4 shown in FIG. 8. The BPF 44 removes unnecessary signals other than the up signal. The resultant up signal is sent to the transmission cable 1 through the switch 3 and the system connection terminal 2.

(b) In the power OFF state of the CATV terminal unit:

In the power OFF state, the contacts of the switches 3 and 14 are connected as shown in FIG. 6. The contact of the switch 20 is connected (to terminal e) as shown in FIG. 4. Thus, in the power OFF state, the down signal received from the system connection terminal 2 is supplied as it is to the unit connected to the external unit connection terminal 15 through the switches 3, 14, 20, and external unit connection terminal 15.

With the above-described operation, in the power ON state, a signal with high S/N ratio and free from distortion can be supplied to the tuner 11 and the external unit connection terminal.

In addition, the up signal for bidirectional communication can be sent.

A first effect of the present invention is that an input signal of the system connection terminal is supplied to the external unit connection terminal in the power OFF state. Thus, even in the power OFF state of the CATV terminal unit, an input signal of the system connection terminal can be received with a unit such as a TV receiver or a VCR connected to the external unit connection terminal.

In other words, the first switch that switches a portion to be connected to the system connection terminal and the second switch that switches a portion to be connected to the external unit connection terminal corresponding to the power ON/OFF state are disposed between the system connection terminal and the external unit connection terminal.

A second effect of the present invention is that a signal with high S/N ratio and free from distortion is supplied to the internal tuner and a unit connected to the external unit connection terminal in the power ON state.

In other words, the level detecting device, which detects the level of the input signal, the gain controlling circuit, which generates a control signal corresponding to the detected result of the level detecting device, and the variable attenuator, whose attenuation amount is varied corresponding to the control signal that is output from the gain controlling circuit, are disposed at the preceding stage of the portion that supplies the signal to the tuner and the external unit connection terminal.

A third effect of the present invention is that an up signal for bidirectional communication can be sent. Thus, various bidirectional services of the CATV system can be accomplished.

In other words, the branching device, which branches an up signal and a down signal, and the up signal generating circuit are provided.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A CATV terminal unit, comprising:

a first switch for switching a portion to be connected to a system connection terminal corresponding to an ON/OFF state of a power supply, said first switch having a first terminal and a second terminal, said system connection terminal being connected to the second terminal corresponding to the OFF state of the power supply;

a branching device, connected to said first terminal of said first switch, for branching an up signal and a down signal;

a variable gain controlling unit configured to adjust the level of a first output signal of said branching device;

an up signal generating circuit, connected to said branching device, for generating the up signal;

a radio frequency amplifier for amplifying an output signal of said variable gain controlling unit;

a distributing device for distributing an output signal of said radio frequency amplifier, said distributing device having a first output terminal and a second output terminal;

a tuner for receiving a signal from said first output terminal of said distributing device, said tuner including an amplifier;

a demodulating circuit for demodulating an output signal of said tuner and forwarding the demodulated output signal to an output terminal, and for generating a gain control voltage for controlling a gain of said amplifier of said tuner;

a level detecting device for detecting the level of the output signal of said radio frequency amplifier;

a gain controlling circuit for controlling a gain of said variable gain controlling unit corresponding to the detected result of said level detecting device; and a second switch for switching a portion to be connected to an external unit connection terminal, such that said external unit connection terminal is connected to either said second terminal of said first switch or said second output terminal of said distributing device, said external unit connection terminal being connected to said second terminal of said first switch according to the OFF state of the power supply.

2. The CATV terminal unit as set forth in claim 1, wherein said distributing device is disposed after said branching device, said first output terminal of said distributing device being connected to said variable gain controlling unit, said second output terminal of said distributing device being connected to said second switch through a second radio frequency amplifier.

3. The CATV terminal unit as set forth in claim 1, further comprising:

an RF modulator for modulating the output signal of said demodulating circuit; and a third switch for inputting an output signal of said RF modulator and an output signal of said second switch, and for selecting and switching a signal that is output to said external unit connection terminal corresponding to a control signal received from a switch controlling unit.

4. A CATV terminal unit, comprising:

a first switch having a common terminal, a first terminal, and a second terminal, the common terminal being connected to a transmission cable, the common terminal being connected to the first terminal in a power ON state, and the common terminal being connected to the second terminal in a power OFF state;

a second switch having a common terminal, a first terminal, and a second terminal, the common terminal of the second switch being connected to the first terminal of the second switch in the power OFF state, the common terminal of said second switch being connected to the second terminal of said second switch in the power ON state, the first terminal of said second switch being connected to the second terminal of said first switch;

a branching device, connected to the first terminal of said first switch, for branching a frequency of the input/output signal of said first switch into two frequency bands connected to at least a high band terminal and a low band terminal;

an up signal generating circuit, connected to the low band terminal of said branching device, for outputting an up signal;

a radio frequency AGC circuit, connected to the high band terminal of said branching device, for receiving a down signal from the transmission cable and varying the gain of the down signal with a level detecting device; and a distributing device for distributing an output signal of said radio frequency AGC circuit, including distributing the output signal to an output terminal, said distributing device having a first output terminal and a second output terminal;

wherein said first output terminal of said distributing device is connected to the second terminal of said second switch, wherein in the power ON state the up signal and down signal being sent and received through the transmission cable, respectively, and in the power OFF state the down signal being directly sent as it is to an external unit through the first and second switch.

5. The CATV terminal unit as set forth in claim 4, further comprising:

a tuner, connected to said second output terminal of said distributing device, for selecting a radio frequency signal received through the transmission cable and converting the selected radio frequency signal into an intermediate frequency.

6. The CATV terminal unit as set forth in claim 5, further comprising:

a demodulator, connected to said tuner, for converting said intermediate frequency signal into a base band signal, and outputting the base band signal to the output terminal.

7. A CATV terminal unit, comprising:

a first switch for switching a portion to be connected to a system connection terminal corresponding to an ON/OFF state of a power supply, said first switch having a first terminal and a second terminal;

a branching device, connected to said first terminal of said first switch, for branching an up signal and a down signal;

a variable gain controlling unit configured to adjust a level of an output signal of said branching device;

an up signal generating circuit, connected to said branching device, for generating the up signal;

a radio frequency amplifier for amplifying an output signal of said variable gain controlling unit;

a distributing device for distributing an output signal of said radio frequency amplifier, said distributing device having a first output terminal and a second output terminal;

a tuner for receiving a signal from said first output terminal of said distributing device, said tuner including an amplifier;

a demodulating circuit for demodulating an output signal of said tuner and forwarding the demodulated output signal to an output terminal, and for generating a gain control voltage for controlling a gain of said amplifier of said tuner;

a voltage monitoring circuit for monitoring a gain control voltage of said demodulating circuit and controlling said variable gain controlling unit when the gain control voltage exceeds a predetermined threshold value;

a gain controlling circuit for controlling a gain of said variable gain controlling unit based on a result of said voltage monitoring circuit; and a second switch for switching a portion to be connected to an external unit connection terminal, such that said external unit connection terminal is connected to either said second terminal of said first switch or said second output terminal of said distributing device.

\* \* \* \* \*